United States Patent [19]

Baker

[11] Patent Number: 5,461,904

[45] Date of Patent: Oct. 31, 1995

[54] LEAK DETECTION MEANS AND METHOD

[75] Inventor: Peter Baker, Wales, Great Britain

[73] Assignee: Texaco Limited, London, England

[21] Appl. No.: 120,626

[22] Filed: Sep. 13, 1993

[51] Int. Cl.⁶ .................................................. G01M 3/28
[52] U.S. Cl. ........................... 73/46; 277/2; 73/49.8
[58] Field of Search ........................ 73/46, 49.8; 277/2

[56] References Cited

U.S. PATENT DOCUMENTS

| | | | |
|---|---|---|---|
| 3,131,638 | 5/1964 | Wilson et al. | 73/40 X |
| 3,996,789 | 12/1976 | Wilson | 73/46 X |
| 4,019,371 | 4/1977 | Chaplin et al. | 73/49.8 X |
| 4,420,970 | 12/1983 | Organi | 73/49.8 X |
| 4,888,979 | 12/1989 | Steeper | 73/49.8 X |
| 5,170,659 | 12/1992 | Kemp | 73/46 |

Primary Examiner—Hezron E. Williams
Assistant Examiner—J. David Wiggins
Attorney, Agent, or Firm—George J. Darsa; Harold J. Delhammer

[57] ABSTRACT

It is an object of the present invention to provide a leak detection means that directs any leaked fluid to a single preselected radial point where it contacts and activates an indicating means. The means for defining the leakage flow path to the indicating means also acts as a barrier preventing contamination of the flange bolts by any leaking fluid.

4 Claims, 2 Drawing Sheets

LEAK DETECTION MEANS AND METHOD

BACKGROUND OF THE INVENTION

1. Field of the Invention

The present invention relates to detecting means and methods in general, and more particularly, to leak detecting means and methods.

2. Description of the Prior Art

The present invention relates to an apparatus for leak detection and control and more specifically, but not exclusively, to an apparatus for detecting and controlling leaks in joints between flanged pipes bolted together in a fluid filled system.

Maintenance of seal integrity between adjacent flanged pipes is of primary importance in a fluid filled system. Typically, the seal is affected by a spiral wound gasket which is located between the flanges of a pipe joint. The gasket is retained in position inside the flange bolting by a centering ring which is located concentrically outside the gasket.

In use, the gasket is subject to warping and damaging stresses. It may be exposed to temperature extremes or the corrosive effects of the fluid within the pipe. Such conditions promote deterioration of the material of the gasket and can lead to failure of the seal with subsequent leakage of the fluid from the pipe to the exterior. Leakage can occur at any point around the circumference of the pipe joint. The leaking fluid will thus contaminate the bolts of the flange joint and may, depending upon its properties, corrode the structure of the pipe joint itself.

Obviously, it is important that any leakage is detected, contained and repaired quickly. Detection of leaks is usually by visual inspecting by operators on inspection rounds. However, since leakage can occur at any point around the joint, it may be that the actual leak is not apparent from the inspection date.

A number of devices and methods have been previously proposed for detecting leakage from such flanged joints. GB-1431048 and GB-1534874 disclose leak protection apparatus in which the whole flange is encapsulated by a rubber strip which is secured by a stud. An axial port extends through the stud through which a detection means is attached.

In GB-1431048, the detection means is an inflatable plastic or rubber bag.

In GB-1534874, the detection means is a transparent tube packed with a material which changes color on contact with the leaking fluid. To test for leakage, the fluid is withdrawn through the tube by a handpump.

GB-1570911 discloses a method of detecting leaks by applying an indicating substance to the flange faces which is activated by the exuding fluid.

U.S. Pat. No. 3,485,085 discloses a device for detecting leaks in a cooling system where water is the coolant. A container with an aperture is placed over the suspected leakage point. The container is filled with an insulating material to condense the water and a moisture-sensitive tape indicates the leak.

U.S. Pat. No. 2,601,840 discloses a leak indicating system applied externally to the flanged joint. The whole joint is enclosed in the cover structure which has an indicating element in tape form disposed on its outer surface. The indicating element may pick up seepage emanating from the opening.

In each of these prior art devices and methods, any leaked fluid can contact the bolts and structure of the flanged joint, contaminating the surface and corroding the pipe work. Leakage can occur randomly at any radial point about the circumference of the joint and thus the change in the apparatus indicating the leak could also be inaccessible or invisible from the inspection point.

SUMMARY OF THE INVENTION

It is an object of the present invention to provide a leak detection means that directs any leaked fluid to a single preselected radial point where it contacts and activates an indicating means. The means for defining the leakage flow path to the indicating means also acts as a barrier preventing contamination of the flange bolts by any leaking fluid.

According to a first aspect of the invention, there is provided a detector means for detecting leaks in a joint between adjacent flanged pipes wherein said joint is sealed by a gasket characterized in that a flat, annular element surrounds said gasket and is provided with projection means adapted to extend radially outwards from the flanges to the exterior, whereby any fluid leaking beyond said gasket is identifiable at said projection means.

Preferably, the projection means extends radially outwards in the same plane as the flat, annular ring.

According to a second aspect of the invention, the flat annular element is provided with a barrier means substantially surrounding an outer peripheral edge thereof said barrier means being so configured as to direct any leaked fluid along a flow path into the radially extending projection means where it may be detected and thereby preventing any leakage of fluid except to the projection means.

Preferably, the barrier means is a molded plastic bead.

Preferably, the molded plastic base is PTFE.

Preferably, the flanges are fixed together by bolts arranged radially outwardly from the barrier means.

Preferably, at least part of the radially extending projection means is coated with an indicating substance that is activated by any leaked fluid.

In an alterative embodiment, the leaked fluid may be detected using a Draeger™ sampler.

In a further embodiment, any leakage of fluid may be detected by a pressure sensitive means, e.g., by connecting a flexible bladder in fluid communication with the projection means so that any leaked fluid directed into the radially extending projection means passes into the bladder causing inflation.

DESCRIPTION OF THE INVENTION

Figure 1:
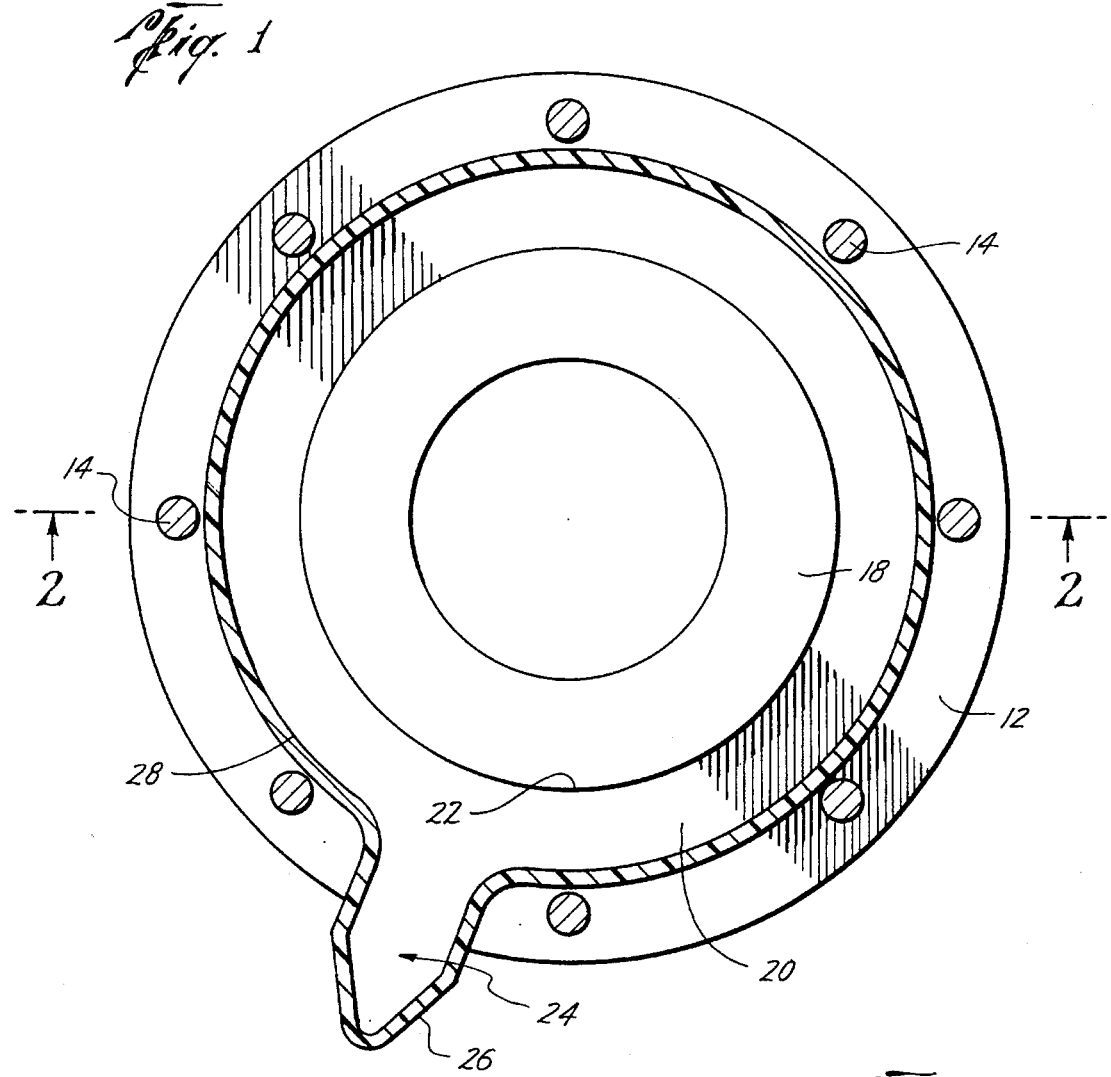
FIG. 1 is a horizontal cross-section taken on the line 1—1 of FIG. 2 of a detector means embodying the invention.
Figure 2:
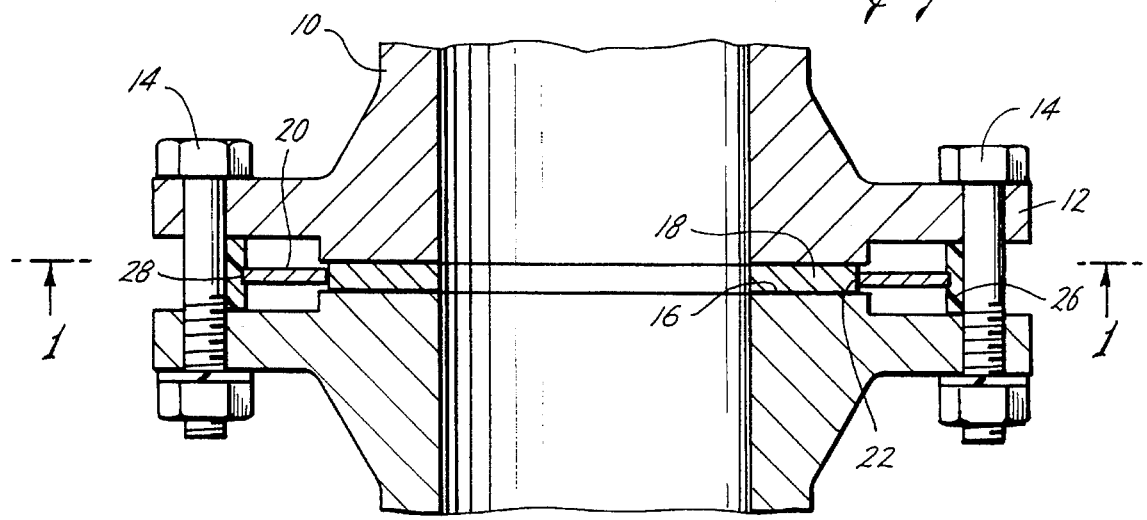
FIG. 2 is a vertical sectional view through a flanged joint taken on the line 2—2 of FIG. 1.

Referring to FIGS. 1 and 2 of the drawings, there is shown a pipe 10 having a flange 12 at one end. The pipe 10 is attached to an adjacent, abutting flanged pipe by bolts 14. The joint 16 between the abutting flanged pipes is sealed by a gasket 18 which is commonly a spiral wound gasket. The gasket 18 is retained in position on the joint surface 16, concentrically inside the flange bolts 14, by a flat, annular element 20. The Gasket 18 is accommodated within the aperture 22 of the annular element 20.

In the embodiment illustrated in FIG. 1, the flat annular element 20 has a projection means 24 which extends radially outward from flanges 12 to the exterior. The annular element 20 may be arranged within the flanges 12 so that the projection means 24 extends outwards from the flanges at any pre-selected point.

Any fluid leaking beyond the gasket will flow onto the annular element 20 and thus, eventually will flow into the integral projection means 24. The leaked fluid then can flow along the projection means to the exterior where it may be detected.

In this embodiment, the annular element 20 is provided with a barrier 26 of a molded plastic, e.g., PTFE. The barrier 26 surrounds an outer peripheral edge 28 of the annular element 20. The barrier 26 serves to direct any leaked fluid around the annular element 20, into the projection means 24 and to the exterior where it may be detected. The barrier 26 also acts to prevent any leaked fluid contaminating the bolts 14 and the outer periphery of the flanges 12.

Any leaked fluid may be detected by a number of conventional means. For example, the projection means 24 extending outwards at the selected point from the flanges 12 may be painted with an indicating substance which undergoes a color change on contact with any leaked fluid.

Figure 3:
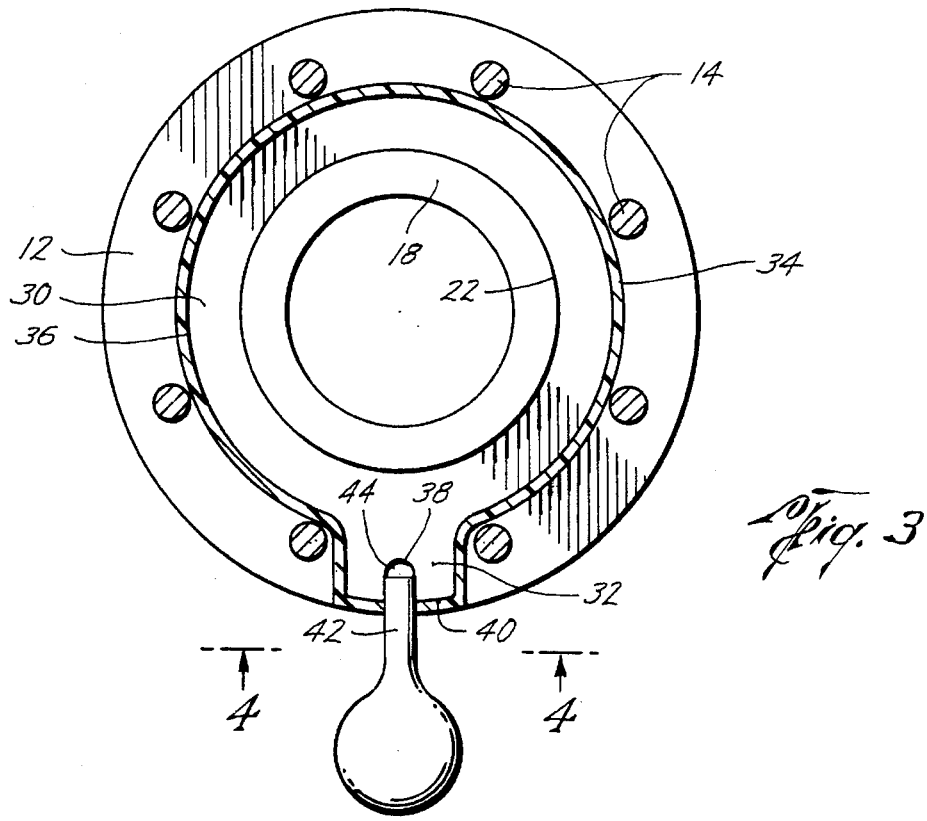
FIG. 3 is a horizontal cross-section of an alternative embodiment of the invention wherein leaked fluid is directed into a flexible bladder for detection.
Figure 4:
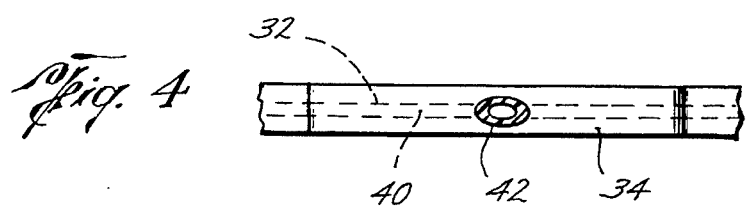
FIG. 4 is an enlarged sectional view along line 4—4 of FIG. 3.
Figure 5:
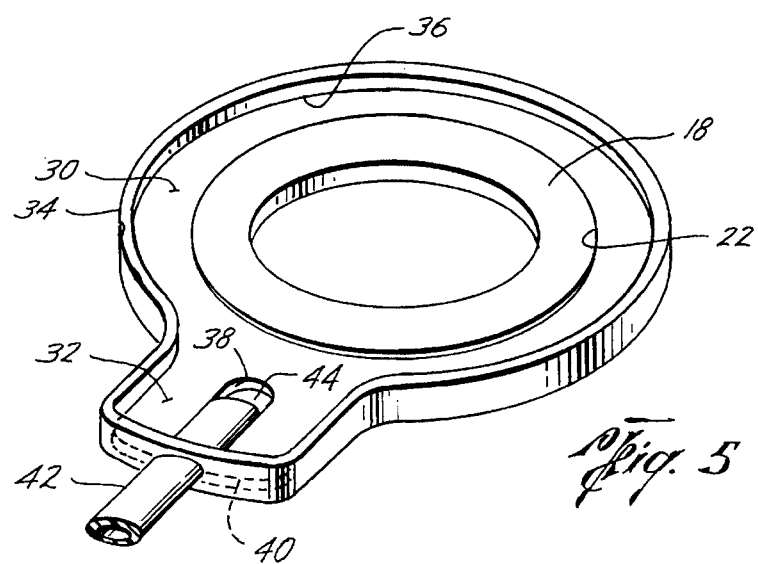
FIG. 5 is an enlarged elevation pictorial view showing the projection means and plastics barrier adapted for connection to a pressure sensitive detector.

An alternative means of detecting leakage is illustrated in FIGS. 3, 4 and 5. As in the previously described embodiment, the gasket 18 is accommodated within the aperture 22 of the annular element 30. The annular element 30 has a projection means 32 which extends radially outwards onto the flanges 12. However, the projection means 32 terminates within the flanges and does not protrude into the exterior. Thus, when the bolts 12 are tightened and the joint is sealed, the projection means 32 is not open to or visible form the exterior.

The annular element 30 is provided with a barrier 34 of molded plastics, e.g., PTFE. The barrier 34 surrounds the outer peripheral edge 36 of the annular element 30. As in the previous embodiment, the barrier 34 acts to direct any leaked fluid round the annular element 30 into the projection means 32 for detection.. It also serves to prevent any leaked fluid contaminating the bolt and the outer periphery of the flanges.

As shown in FIG. 5, the projection means 32 is provided with an indentation 38 through which the upper and lower faces of the annular element 30 are in fluid communication. The indentation 38 extends longitudinally inwards from the outer peripheral edge 40 of the projection means 32 to a point radially inside the flange bolts 14. A tube 42 of ellipsoidal cross-section, hereinafter referred to a flattened tube, is accommodated within the indentation 38 to receive any leaked fluid and to channel it to the exterior for detection. The tube 42 extends from the exterior into the space between the flanges but does not extend into the full length of the indentation 38. A small gap 44 remains unoccluded which allows the upper and lower faces of the annular element 30 to remain in fluid communication so that any leaked fluid from either face is directed into the projection means.

The barrier 34 surrounds the entire annular element 30 and projection means 32, passing over the indentation 38 and flattened tube 42 to provide a continuous barrier around the complete outer periphery of the annular element 30. Thus, any fluid leaking beyond the gasket will flow eventually into the projection means 32. Since the outer peripheral edge of the projection is sealed within the flanges, any leaked fluid is forced to flow into the flattened tube 42 inserted into the indentation 38. Any leaked fluid may be conducted from the flattened tube 42 to a detection means such as an inflatable bladder.

In use of the invention, the annular element is seated within the joint between the abutting adjacent flanged pipes so that the projection means is located at a pre-selected radial point between the flanges. If the gasket fails and fluid begins to leak from the joint, it will be retained within the joint area by the PTFE barrier and prevented from containing the bolts securing the flanges. The barrier will channel any leaking fluid around the annular element into the projection means where it may be detected. Detection may be achieved by direct means such as coating the projection means in a substance sensitive to any particular leaking fluid. Upon contact with any leaked fluid, the substance undergoes a visible change. Alternatively, any leaked fluid may be detected by more complex means such as Draeger™ samplers or pressure sensitive devices.

What is claimed is:

1. A leak detector which detects leaks in a flanged joint sealed by a gasket comprising:

a flat annular ring surrounding a gasket having a detector comprising a projection means adapted to extend radially outward from the flanges to the exterior in a manner so that fluid leaking beyond such gasket is identifiable at said projection means, said projection means extending in the same plane as the flat annular ring; and a barrier means of a molded plastic bead substantially surrounding an outer peripheral edge of the flat annular ring, said bead being so configured as to direct any leak fluid along a flow path onto the radially extending projection means.

2. A detector as claimed in claim 1 in which the projection means is coated with an indicating substance so that there is an indication of any leaking fluid.

3. A detector as described in claim 1 further comprising means for being inflated by leaking fluid.

4. A detector as described in claim 1 further comprising pressure sensitive means connected to the projection means for detecting any leaking fluid.

* * * * *